(12) United States Patent
Young et al.

(10) Patent No.: US 8,400,477 B1
(45) Date of Patent: Mar. 19, 2013

(54) OBJECT RESIZING

(75) Inventors: David S. Young, San Francisco, CA (US); Robert A. Walker, II, San Francisco, CA (US)

(73) Assignee: Google Inc., Mountain View, CA (US)

( * ) Notice: Subject to any disclaimer, the term of this patent is extended or adjusted under 35 U.S.C. 154(b) by 942 days.

(21) Appl. No.: 12/123,970

(22) Filed: May 20, 2008

(51) Int. Cl.
*G09G 5/00* (2006.01)
*G06F 3/048* (2006.01)
(52) U.S. Cl. ........................................ 345/665; 715/800
(58) Field of Classification Search .......... 345/660–671; 715/788, 798, 800, 801
See application file for complete search history.

(56) References Cited

U.S. PATENT DOCUMENTS

| | | | | |
|---|---|---|---|---|
| 5,956,032 | A * | 9/1999 | Argiolas | 715/798 |
| 7,110,005 | B2 * | 9/2006 | Arvin et al. | 345/619 |
| 7,190,379 | B2 * | 3/2007 | Nissen | 345/660 |
| 2005/0168488 | A1 * | 8/2005 | Montague | 345/659 |

OTHER PUBLICATIONS

Adobe. Adobe Illustrator 10: Classroom in a Book. San Jose, CA: Adobe, 2002.*
Kay et al.. Paint Shop Pro 9 for Dummies. Hoboken, NJ: Wiley, 2005.*
McGuffin et al. 2005. Fitts' law and expanding targets: Experimental studies and designs for user interfaces. ACM Trans. Comput.-Hum. Interact. 12, 4 (Dec. 2005), 388-422.*

* cited by examiner

*Primary Examiner* — Ke Xiao
*Assistant Examiner* — Jed-Justin Imperial
(74) *Attorney, Agent, or Firm* — Ropes & Gray LLP

(57) ABSTRACT

A computer program product has a computer-readable storage medium having computer program instructions embodied therein for performing a method for resizing an object. The method may include positioning a cursor to a handle of the object; selecting the handle; repositioning the handle in a direction to modify the geometry of the object; moving the handle away from the corner of the object along a path designated for maintaining the object's height, width, or aspect ratio; and confirming a new location of the handle for a resized object; wherein the resized object is displayed to the user.

27 Claims, 13 Drawing Sheets

OBJECT RESIZING

FIELD OF THE INVENTION

The present application relates generally to methods and systems for resizing of an object on a graphical user interface.

BACKGROUND

Spatial editors may require key commands in conjunction with mouse movements and clicks for resizing an object, such as an image or a shape, represented on a graphical interface. For a rectangular object, a user selects and moves one of eight handles (one at each corner and one on each side) in order to resize the object. The side handles may allow the user to resize the object in only one dimension. When using a corner handle, the selected object may default to resizing by maintaining the aspect ratio. But a user typically does not know the default setting (e.g., maintaining aspect ratio, maintaining height, maintaining width) for the particular object without first attempting to resize the object or utilize key commands. Additionally, once the object is selected for resizing, Fitts's law suggests that the further a mouse moves a cursor from the original position of a resizing handle, the harder it will be for the user to move to a particular target outcome, i.e., maintain an aspect ratio or a horizontal or vertical extension. Moreover, it would be challenging for a user, once a handle were selected, to utilize a different handle to accomplish a different type of resizing, e.g., first using a side handle for a horizontal resizing and then choosing to use a corner handle to maintain the aspect ratio. Thus, what is desired is a system that helps overcome one or more of the above-described limitations.

SUMMARY

In one embodiment, a computer program product has a computer-readable storage medium having computer program instructions embodied therein for performing a method for resizing an object. The method includes positioning a cursor to a handle of the object; selecting the handle; repositioning the handle in a direction away from the object along a path designated for maintaining the object's height, width, or aspect ratio; and confirming a new location of the handle for a resized object; wherein the resized object is displayed to the user.

In another embodiment, a computer program product has a computer-readable storage medium having computer program instructions embodied therein for performing a method for resizing an object. The method includes establishing at least one of a plurality of gutters in response to a user selecting a handle on a corner of the object. The plurality of gutters include a horizontal gutter extending from the corner in a horizontal direction; a vertical gutter extending from the corner in a vertical direction; and an aspect ratio gutter extending from the corner along a line having the same vertical to horizontal ratio as the aspect ratio of the object. The method also includes displaying an indicator when the user moves the handle to a position within one of the plurality of gutters; displaying a representation of a resized version of the object based upon the position of the handle; and displaying a resized object extending substantially to the position of the handle. If the handle is in the horizontal gutter, then the object is resized in only a horizontal direction. If the handle is in the vertical gutter, then the object is resized in only a vertical direction. If the handle is in the aspect ratio gutter, then the object is resized by maintaining the aspect ratio of the object. If the handle is in a position outside all of the plurality of gutters, then the object is resized at that position.

In yet another embodiment, a method for resizing an object represented on a user interface includes receiving from a user a first directional input representing an initial trajectory from a first point associated with the object toward a second, desired point; based upon the received first input, inferring a resizing modality desired by the user for selection from among a plurality of resizing modalities, and selecting the inferred resizing modality from among the plurality of resizing modalities for accommodating the user's entry of the directional input; and presenting the selected resizing modality on the user interface, whereby the selected resizing modality provides a guide to facilitate the user resizing the object towards the second desired location.

In yet another embodiment, a system for allowing a user to resize an object includes a handle for selection by a user on each corner of the object; a horizontal gutter that maintains a fixed height of the object when the user positions the handle in the horizontal gutter; a vertical gutter that maintains a fixed width of the object when the user positions the handle in the vertical gutter; and an aspect ratio gutter that maintains a fixed aspect ratio of the object when the user positions the handle in the aspect ratio gutter; wherein the horizontal gutter, vertical gutter, and aspect ratio gutter are accessible by each corner handle.

In yet another embodiment, a system for resizing an object including a means for selecting the object; a means for indicating a desired change in one of a plurality of geometrical dimensions of the object in communication with the means for selecting; a means for maintaining a plurality of geometrical dimensions of the object from the means for indicating, wherein a movement to a new location of the means for indicating represents the desired change in one of the plurality of geometrical dimensions; and a means for reconfiguring the object wherein the new location of the means for indicating with respect to the means for maintaining represents a change in one of the plurality of geometrical dimensions of the object.

BRIEF DESCRIPTION OF THE DRAWINGS

The preferred embodiments of the present invention are illustrated by way of example and not limited to the following figures.

DETAILED DESCRIPTION

Reference will now be made in detail to the preferred embodiments of the present invention, examples of which are illustrated in the accompanying drawings. Overview Systems and methods described herein may be used to allow resizing of an object while optionally maintaining a fixed height, width, or aspect ratio. The object may include, but is not limited to an image, shape, or text, and is not intended to be limited to a two-dimensional object. Resizing of an object may involve modification of the magnitude of the object in one or more spatial dimensions. The shape of the object may or may not be invariant under resizing, i.e., a resizing operation may have the effect changing dimensions and/or shape. When a user selects a handle for resizing the object, a plurality of gutters or lines of extension may assist the user in maintaining a fixed height, width, or aspect ratio from a single handle.

System Architecture

Figure 1:
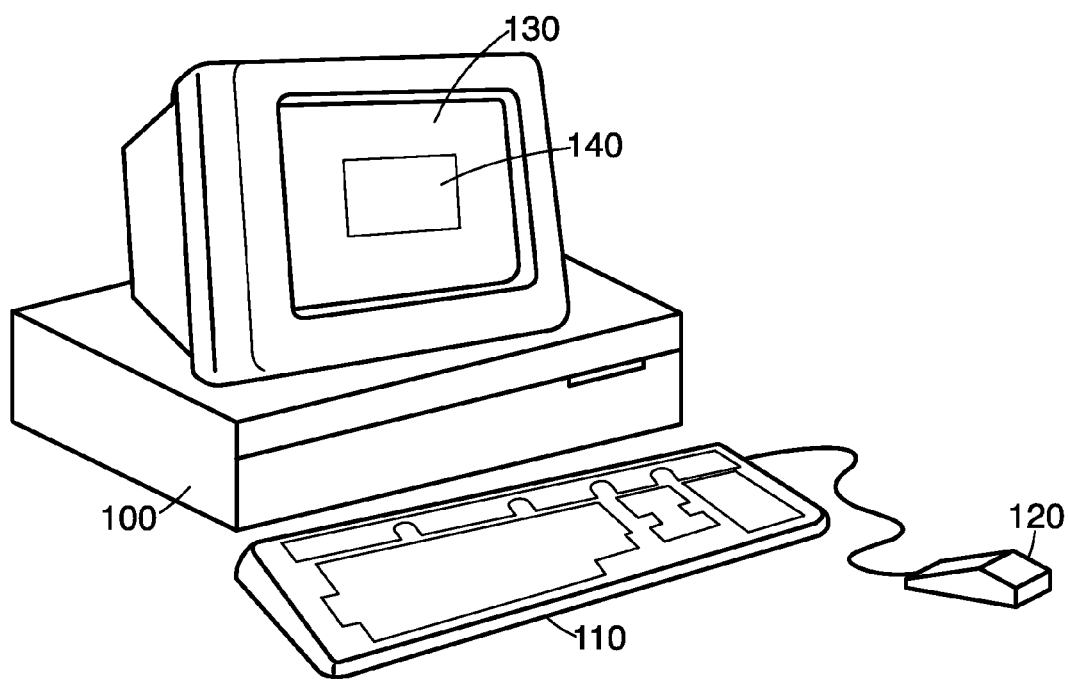
FIG. 1 shows an apparatus for resizing an object according to an exemplary embodiment.

Referring to FIG. 1, an apparatus for resizing an object according to an exemplary embodiment is shown. A computer 100 may include a plurality of input devices, such as a keyboard 110 and a mouse 120. It is intended that other input devices may be used, including a pointing device, trackball, touch screen, and the like. A display 130 of the computer 100 may present a graphical user interface 140. A computer program may be stored on and/or executed by the computer 100 that allows the user to resize the object on the graphical user interface 140 on the display 130. The graphical user interface 140 may show an object, such as an image, to a user. The user may manipulate the object in various dimensions and geometries. In order to manipulate or resize the object, the user may use the mouse 120 for directing the graphical user interface 140 to adjust of one or more of the object's dimensions. In some instances, the keyboard 110 may also be used by the user to manipulate the object.

Process

In an exemplary embodiment, a method for resizing an object on a graphical user interface is as follows. A user positions a cursor on one of four handles on the corners of an object. As the user drags the handle away from the existing position of the object using the mouse, the object is "ghosted" and a resize outline appears to show the size of the object at the current position of the handle. During the resizing, an indication mechanism, such as a highlighted extension path, alerts the user that the user's handle position is in a fixed height, width, or ratio "gutter." The indication mechanism can change the visual treatment of the resize border and/or add iconography on or near the object. When the user directs the handle back to the original location (or near the original location), the indication mechanism may change the visual treatment of the resize border and/or add iconography on or near the object. In an alternative embodiment, an invisible path (for a fixed height, width, or ratio) can be visible to the user. Once the user releases the handle of the object, the object is resized to the boundaries of the resize outline.

A gutter may provide an accepted margin of error along a path or line of extension from a handle. The gutter may remain smaller near the original location of the handle and can allow for minor adjustments to the aspect ratio. A smaller gutter also may allow a shorter mouse movement for switching between fixed height, width, and ratio gutters and for following that desired path further from the object. As the gutters extend away from the original location of the handle, the gutters may maintain a narrow width to allow a user to visually observe the relative line of extension along the fixed height, width, or aspect ratio. At a certain distance from the original location of the handle, however, it may be difficult for the user to maintain both the original location and the path of extension in their foveal region of their vision. As a result, as the user moves further from the original location, the gutters may widen to compensate for more inaccurate gestures, accounting for Fitts's law. In one embodiment, the gutter may obtain a maximum width to avoid utilizing too much of the available user interface area and can also prevent users from easily escaping fixed resizing constraints.

Figure 2:
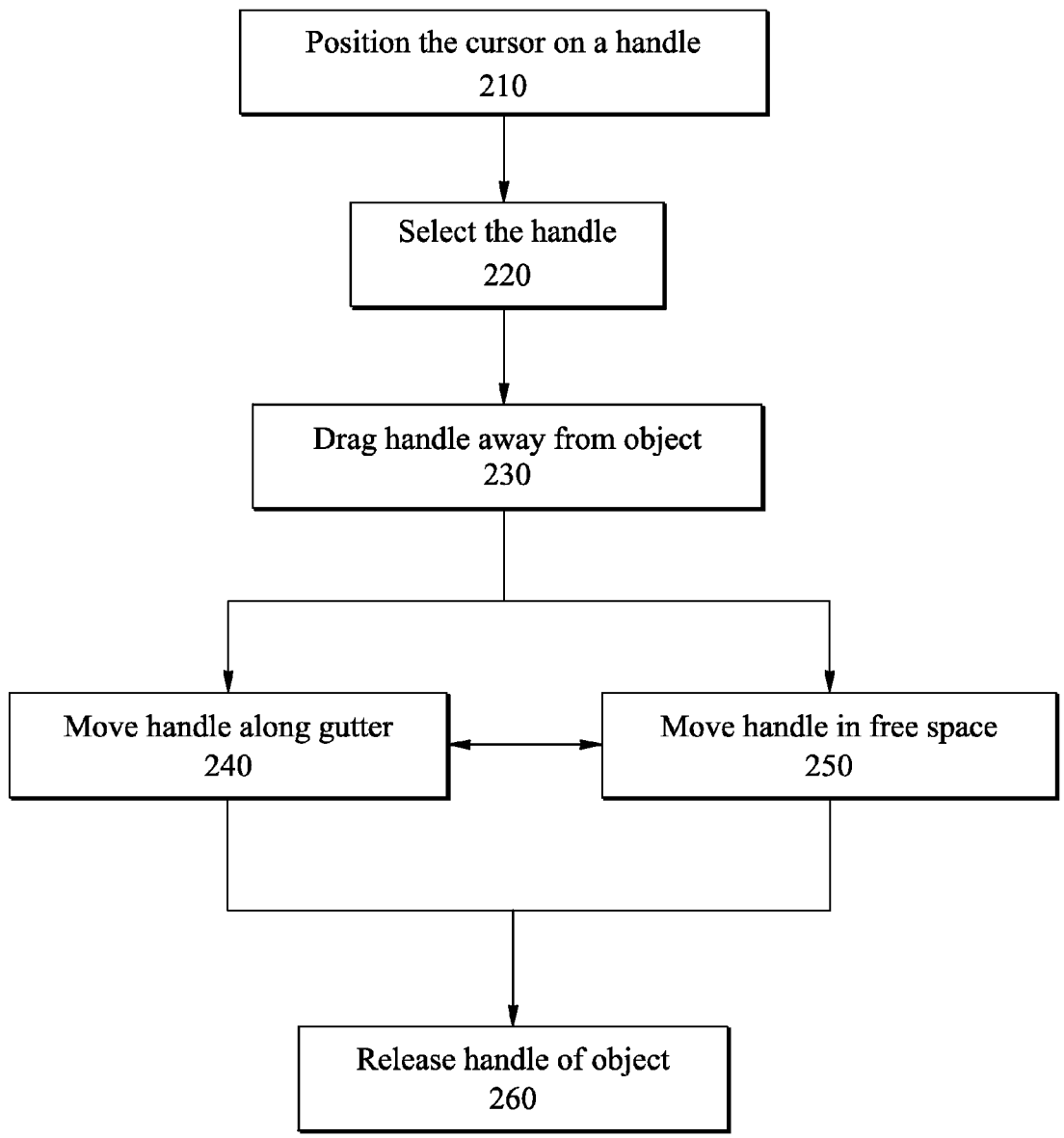
FIG. 2 shows a flow diagram of a method for resizing an object according to an exemplary embodiment.

Referring to FIG. 2, a flow diagram of a method for resizing an object according to an exemplary embodiment is shown. This method may be accomplished using a computer program product having a computer-readable storage medium having computer program instructions embodied therein for performing this exemplary method for resizing an object. A user may use a mouse or other input device to position a cursor on a handle 210 affiliated with an object via a graphical user interface.

The user may select the handle 220, which may occur by depressing a mouse button. Upon selecting the handle, a line of extension extending in a horizontal direction, vertical direction, and a direction maintaining the aspect ratio may be determined and, optionally, presented to the user.

In order to resize the object in any direction, the user may move or drag the handle away from the object 230 in a desired direction. In this exemplary embodiment, the user may move the handle by moving a mouse to direct the handle on the graphical user interface.

The user may position the handle on or near the line of extension in a gutter 240 or move the handle in free space 250. A gutter may be an acceptable distance or range on one or both sides of the line of extension that may guide the user to maintain that vertical, horizontal, or aspect ratio dimension by positioning the handle within that particular gutter. Alternatively, if the user moves the handle to a position outside any or all gutters, the handle may be considered in free space. Additionally, the user may reposition the handle from free space into a gutter and from a gutter into free space.

The user may release the handle of the object 260 to establish a new size of the object. If the handle is positioned in a gutter, the object may be resized according to a point along the affiliated line of extension. If the handle is positioned in free space outside a gutter, the object may be positioned according to a point that does not maintain a horizontal dimension, vertical dimension, or an aspect ratio.

Figure 3:
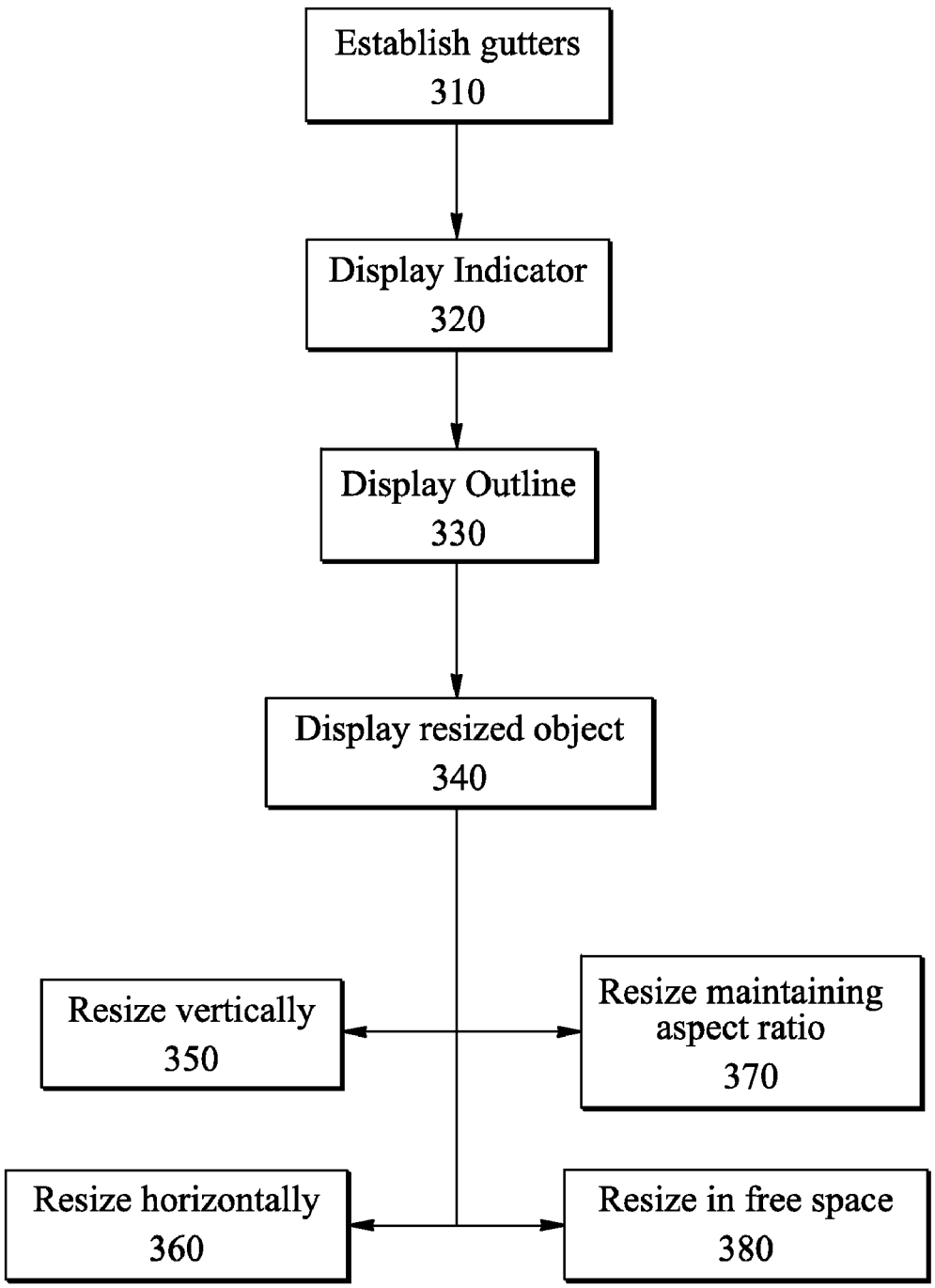
FIG. 3 shows a flow diagram of a method for resizing an object according to an exemplary embodiment.

Referring to FIG. 3, a flow diagram of a method for resizing an object according to an exemplary embodiment is shown. This method may be accomplished using a computer program product having a computer-readable storage medium having computer program instructions embodied therein for performing this exemplary method for resizing an object. At least one of a plurality of gutters may be established 310 in response to a user selecting a handle on the object.

In this exemplary embodiment, the handle may be positioned on a corner of the object. However, it is intended that the handle may be positioned at any location of the object. In this exemplary embodiment, the object has a handle associated with the object at each of the four corners. However, it is intended that there can be any number of handles affiliated with an object.

The plurality of gutters may include a horizontal gutter extending from the corner in a horizontal direction, a vertical gutter extending from the corner in a vertical direction, and an aspect ratio gutter extending from the corner in a direction having the same vertical to horizontal ratio as the aspect ratio of the object. The gutter may include a line of extension as well as an acceptable amount of error along the line of extension in that particular direction.

An indicator may be displayed 320 when the user moves the handle to a position within one of the plurality of gutters. The indicator may show the line of extension, the gutter, an icon representative of the line of extension or gutter, a varied presentation of the object border, or any other visual indication that the handle position is within a gutter. The user may use such indication to guide the handle within the gutter to maintain that desired dimension.

An outline of a resized version of the object based upon the position of the handle may be displayed 330 as the user extends the handle away from the object. The outline may be presented as a dotted line or as a line having a different color. This outline may be displayed substantially in real-time and appear as the handle is moved across the graphical user interface.

A resized object extending substantially to the position of the handle may be displayed 340. If the handle is within a gutter, but not directly on the line of extension, the handle may be positioned on the closest point on the line of extension within that gutter. If the handle is in the vertical gutter, then the object may be resized in only a vertical direction 350. If the handle is in the horizontal gutter, then the object may be resized in only a horizontal direction 360. If the handle is in the aspect ratio gutter, then the object may be resized by maintaining the aspect ratio of the object 370. If the handle is in a position outside all of the plurality of gutters, then the object may be resized at that position 380.

Figure 4:
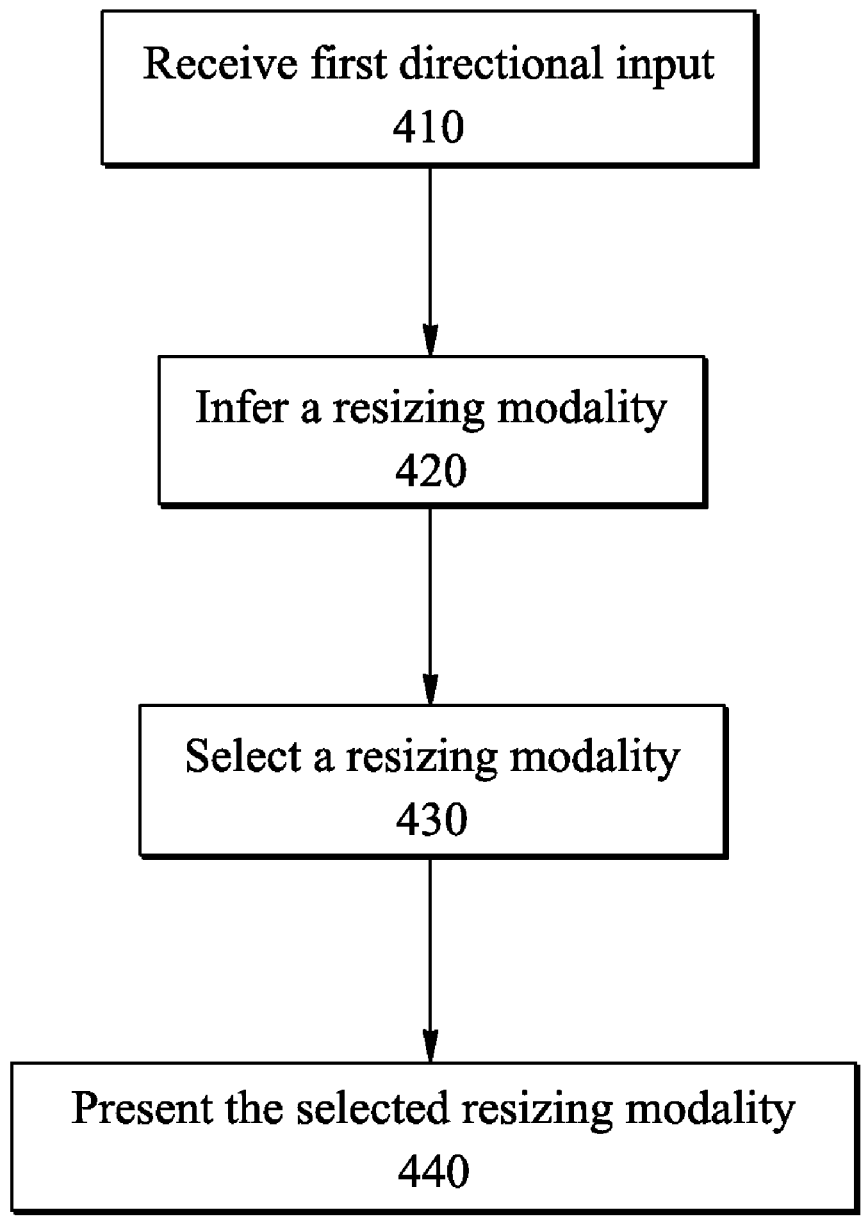
FIG. 4 shows a flow diagram of a method for resizing an object according to an exemplary embodiment.

Referring to FIG. 4, a flow diagram of a method for resizing an object according to an exemplary embodiment is shown. A user may enter a first directional input 410 representing an initial trajectory from a first point associated with the object toward a second, desired point. The directional input may be entered by selecting a handle and moving that handle in a direction towards the desired resizing location of the handle. In another example, the directional input may be entered by selecting the object and directing a cursor towards a desired line of extension.

Based upon the received first input, a resizing modality may be inferred 420 as desired by the user for selection from among a plurality of resizing modalities. A resizing modality may include a line of extension from the object in a direction that can maintain a particular aspect of the object's geometry. The selected resizing modality may provide a guide to facilitate the user resizing the object towards the second desired location. In this exemplary embodiment, a plurality of resizing modalities may include a resizing modality configured to maintain the object's height along a path of extension, a resizing modality configured to maintain the object's width along a path of extension, and/or a resizing modality configured to maintain the object's aspect ratio along a path of extension. A free resize on the user interface without the use of any resizing modality may still be available to the user.

The inferred resizing modality may be selected 430 from among the plurality of resizing modalities for accommodating the user's entry of the directional input. In an exemplary embodiment, if a user's directional input positions a handle or cursor in a gutter or on/near a line of extension from the object, it can be inferred that the user has intended that particular resizing modality. For example, if the user positions a handle from the object on or near a vertical line of extension, it can be inferred that the user intends to maintain the horizontal geometry and only extend the object vertically. In another example, if the user positions a handle from the object on or near a horizontal line of extension, it can be inferred that the user intends to maintain the vertical geometry and only extend the object horizontally. In yet another example, if the user positions a handle from the object on or near a line of extension along the aspect ratio of the object, it can be inferred that the user intends to maintain the aspect ratio of the object.

The selected resizing modality may be presented on a user interface 440. Once a resizing modality is inferred, that resizing modality may be visually shown to the user on the user interface. The resizing modality may be displayed in various ways, including, but not limited to, displaying a line indicating the line of extension, displaying lines indicating the boundaries of an area surrounding the line of extension, displaying an icon indicating the presence within the area surrounding the line of extension, and displaying text indicating the selected resizing modality.

Example

Figure 5:
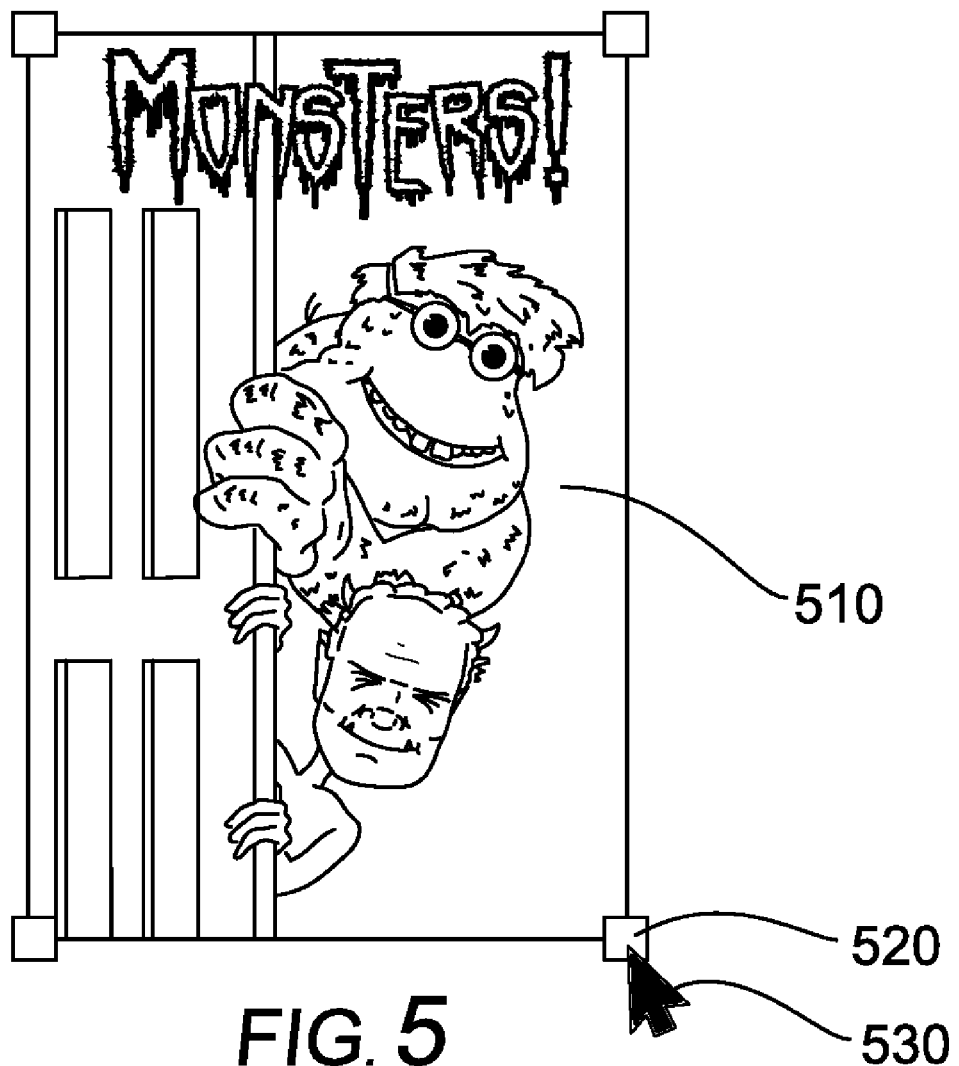
FIG. 5 shows an object according to an exemplary embodiment.

Referring to FIG. 5, an object 510 according to an exemplary embodiment is shown. In this example, object 510 may be presented by a graphical user interface in the configuration described herein. When object 510 is selected, a handle 520 may be presented to the user. Handle 520 may be a used to manipulate and resize the object 510 in at least one dimension. In this exemplary embodiment, handle 520 may be used to resize object 510 in a vertical or horizontal direction, or maintain the aspect ratio of object 510.

Although a handle is described in this exemplary embodiment, it is intended that resizing tools and adjustment mechanisms other than handles may be used. For example, a user may select and reposition a border of the object, an area of the object, or an icon affiliated with the object. It is also intended that any inputs may be used to resize an object other than the selection and movement of a handle. In one embodiment, a user may use a combination of mouse clicks or key commands in conjunction with mouse movements to resize an object. For example, a user can right-click-and-drag or shift-click-and-drag to resize an object. In any embodiment, a gutter or line of extension may still be generated dynamically based on the initial location selected by the user.

In this exemplary embodiment, object 510 has a handle 520 positioned at each corner of the object 510. However, it is intended that handle 520 can be positioned anywhere within the object 510, along the edge of object 510, or outside of the boundaries of object 510. It is also intended that a configuration of the handles 520 is not limited to four handles. In alternative embodiments, an object may have one or more handles, including more than four handles, associated with the object. In this exemplary embodiment, handle 520 appears as a square. However, it is intended that handle 520 can be any shape or configuration, such as a circle, rectangle, bolded line, or an icon.

By manipulating a mouse or other pointing device, the user can position a cursor 530 on handle 520 for resizing the object 510. In this exemplary embodiment, the cursor 530 may be positioned on handle 520 positioned in the lower left corner of object 510. In this exemplary embodiment, it may be useful to select a handle positioned nearest the direction of the side or sides that the user desires to expand or contract. In one example, the user can depress a mouse button to select a particular handle 520.

Figure 6:
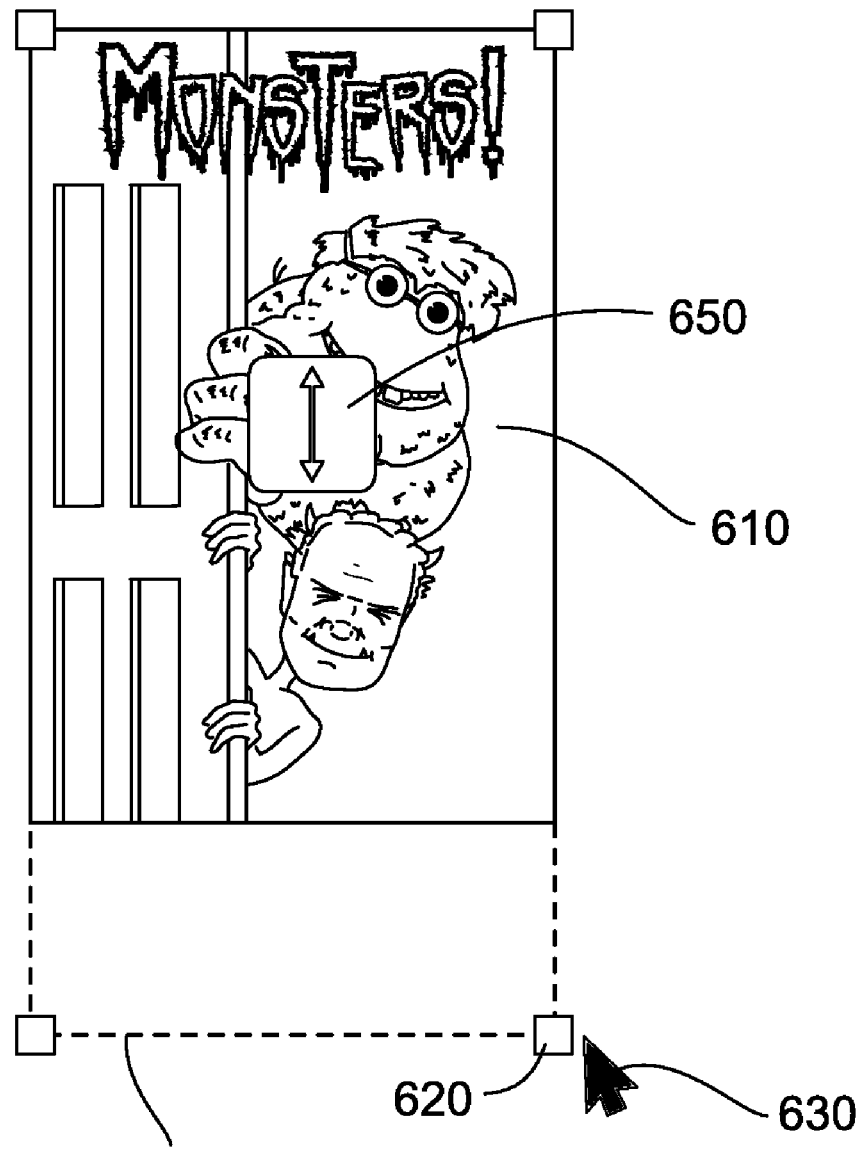
FIG. 6 shows an object according to an exemplary embodiment.

Referring to FIG. 6, an object 610 according to an exemplary embodiment is shown. In this exemplary embodiment, the object 610 and a handle 620 associated with that object 610 have been selected using a cursor 630. The user may move handle 620 to resize object 610. In this exemplary embodiment, handle 620 has been moved in a vertical direction in order to increase the vertical dimension of object 610, while maintaining the horizontal dimension. An icon or other indicator 650 may illustrate a resizing modality (e.g., maintain vertical dimension).

The movement of handle 620 may be reflected by a repositioning of a resizing border 640. Resizing border 640 may represent a new boundary of the object 610 if the object 610 is positioned to that location. In this exemplary embodiment, the resizing border 640 can move substantially in real-time with the movement of the cursor 630. In an alternative embodiment, as handle 620 is repositioned, object 610 may appear "ghosted." A ghosted object may be a translucent version of the original object and may be resized substantially in real time to show a representative resized object at that particular location of the handle.

Figure 7:
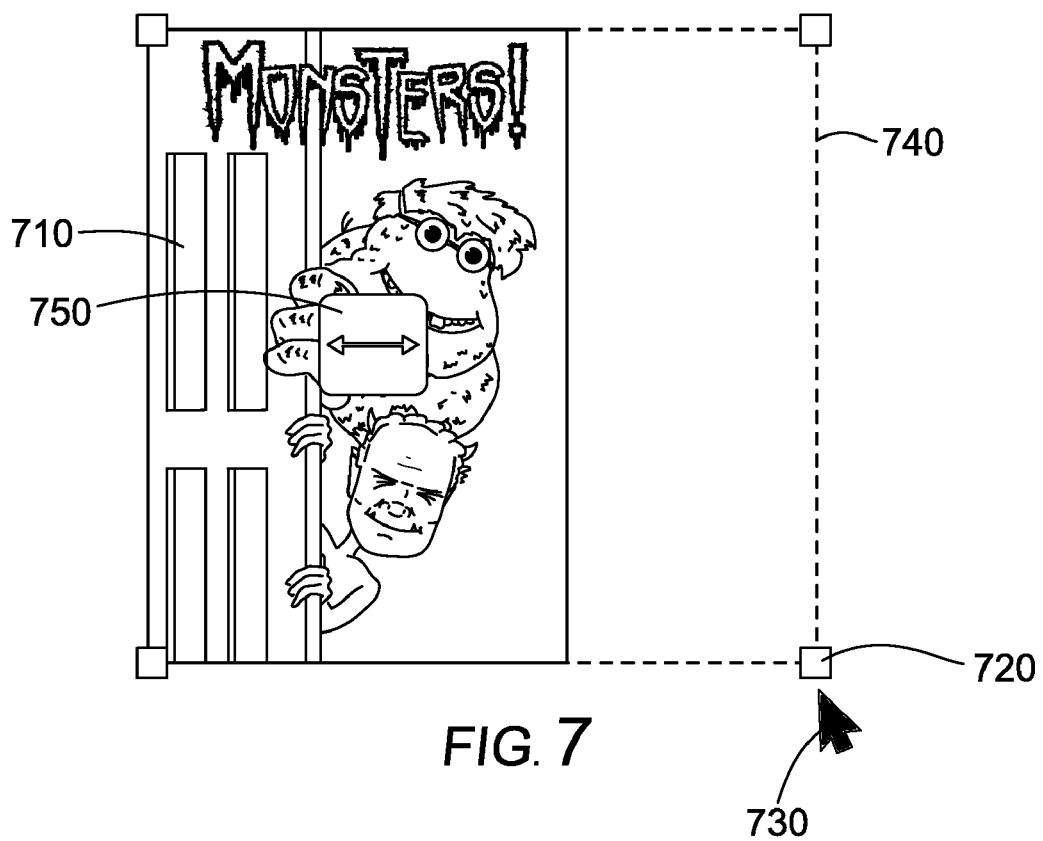
FIG. 7 shows an object according to an exemplary embodiment.

Referring to FIG. 7, an object 710 according to an exemplary embodiment is shown. In this exemplary embodiment, the object 710 and a handle 720 associated with that object 710 have been selected using a cursor 730. The user may move handle 720 to resize object 710. In this exemplary embodiment, handle 720 has been moved in a horizontal direction in order to increase the horizontal dimension of object 710, while maintaining the vertical dimension. An icon or other indicator 750 may illustrate a resizing modality (e.g., maintain horizontal dimension).

The movement of handle 720 may be reflected by a repositioning of a resizing border 740. Resizing border 740 may represent a new boundary of the object 710 if the object 710 is positioned to that location. In this exemplary embodiment, the resizing border 740 can move substantially in real-time with the movement of the cursor 730. In an alternative embodiment, as handle 720 is repositioned, object 710 may appear "ghosted."

Figure 8:
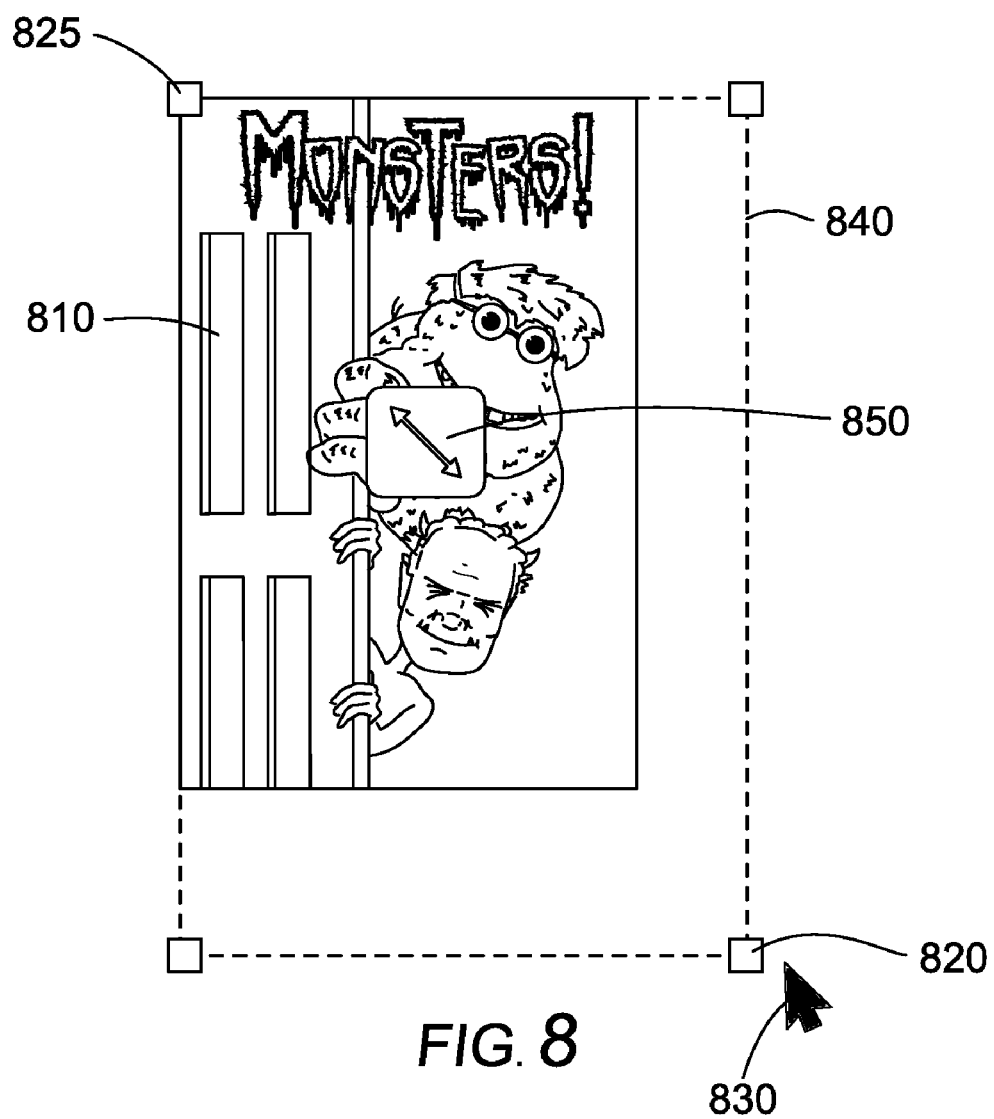
FIG. 8 shows an object according to an exemplary embodiment.

Referring to FIG. 8, an object 810 according to an exemplary embodiment is shown. In this exemplary embodiment, the object 810 and a handle 820 associated with that object 810 have been selected using a cursor 830. The user may move handle 820 to resize object 810. In this exemplary embodiment, handle 820 has been moved in both a horizontal and vertical direction in order to maintain an aspect ratio of object 810. The aspect ratio of object 810 may be determined by the ratio between the height and width of object 810. Any attempts to maintain the aspect ratio while resizing would use the same ratio of height to width. In one example for determining how to maintain the aspect ratio, a straight line extending through both handle 820 and a handle 825 may represent the direction of maintaining the aspect ratio. An icon or other indicator 850 may illustrate a resizing modality (e.g., maintain aspect ratio).

The movement of handle 820 may be reflected by a repositioning of a resizing border 840. Resizing border 840 may represent a new boundary of the object 810 if the object 810 is positioned to that location. In this exemplary embodiment, the resizing border 840 can move substantially in real-time with the movement of the cursor 830. In an alternative embodiment, as handle 820 is repositioned, object 810 may appear "ghosted."

Figure 9:
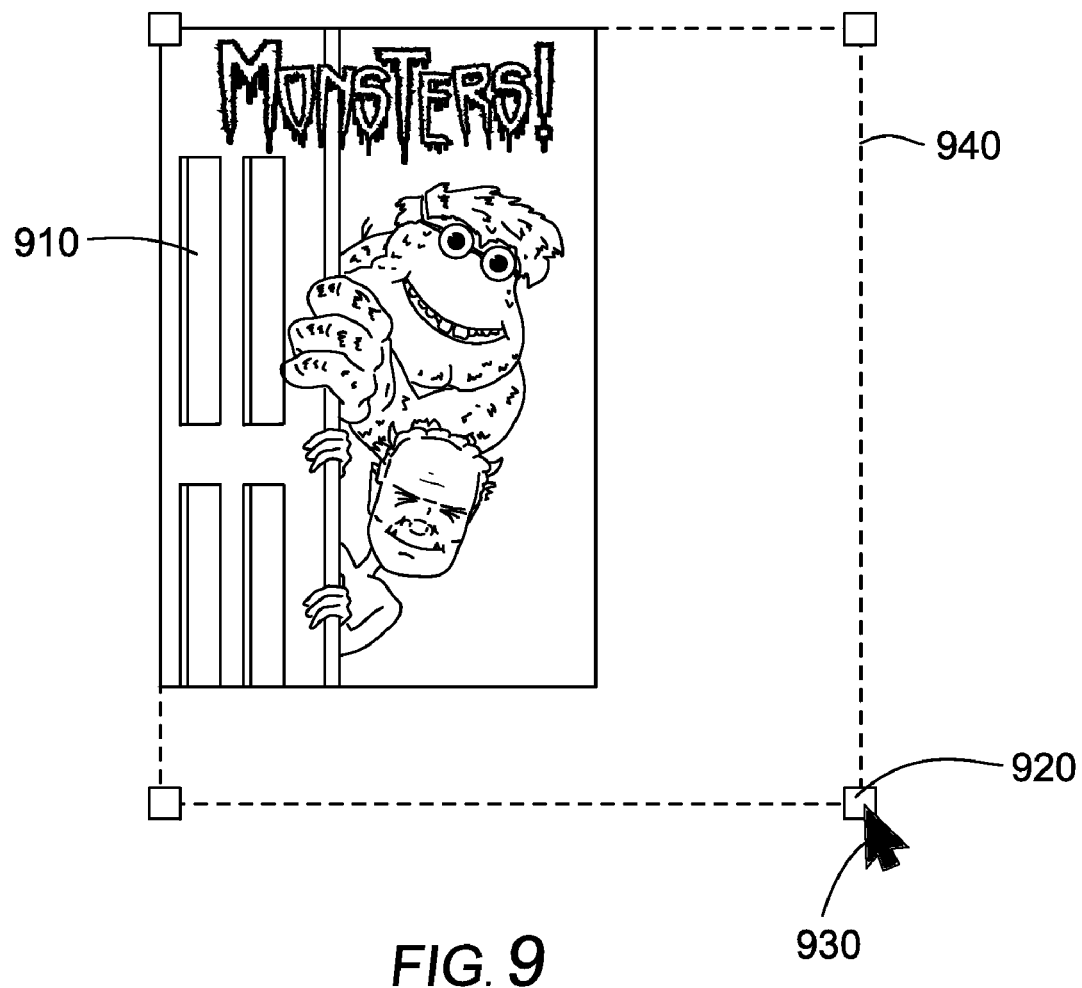
FIG. 9 shows an object according to an exemplary embodiment.

Referring to FIG. 9, an object 910 according to an exemplary embodiment is shown. In this exemplary embodiment, the object 910 and a handle 920 associated with that object 910 have been selected using a cursor 930. The user may move handle 920 to resize object 910. In this exemplary embodiment, handle 920 has been moved within the free space of a graphical user interface in a direction that neither maintains a horizontal dimension, vertical dimension, nor an aspect ratio of object 910.

The movement of handle 920 may be reflected by a repositioning of a resizing border 940. Resizing border 940 may represent a new boundary of the object 910 if the object 910 is positioned to that location. In this exemplary embodiment, the resizing border 940 can move substantially in real-time with the movement of the cursor 930. In this exemplary embodiment, resizing border 940 may be presented on the graphical user interface differently than a resizing border for an object being resized to maintain a vertical dimension, horizontal dimension, or an aspect ratio. For example, resizing border may be a different color or a dashed line. In an alternative embodiment, as handle 920 is repositioned, object 910 may appear "ghosted."

Figure 10:
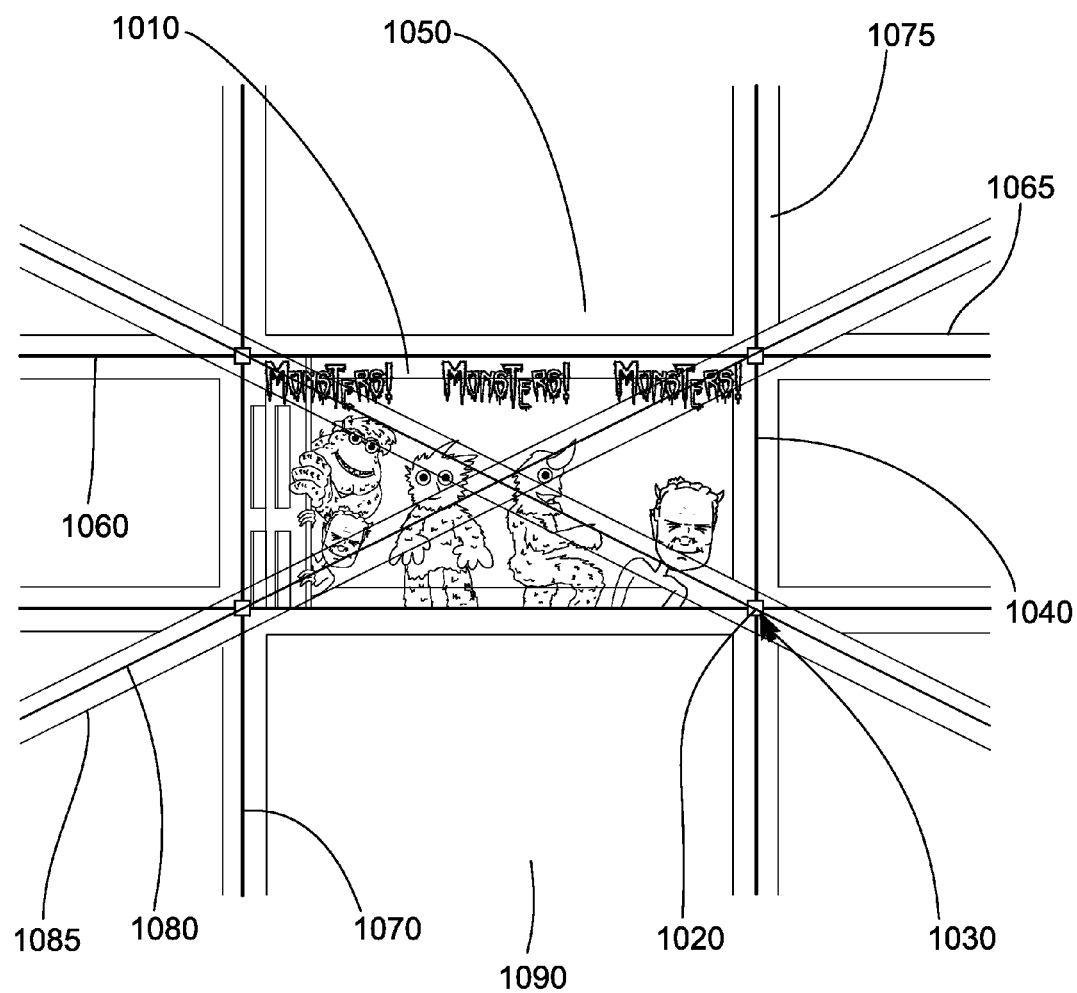
FIG. 10 shows a graphical user interface according to an exemplary embodiment.

Referring to FIG. 10, a graphical user interface 1050 is shown according to an exemplary embodiment. In this exemplary embodiment, an object 1010 and a handle 1020 associated with that object 1010 have been selected using a cursor 1030. The user may move handle 1020 to resize object 1010. In this exemplary embodiment, handle 1020 has been selected for resizing.

Once handle 1020 has been selected, a plurality of lines of extension 1060, 1070, 1080 are presented to the user on the graphical user interface 1050. In this exemplary embodiment, a horizontal line of extension 1060, a vertical line of extension 1070, and an aspect ratio line of extension 1080 are all presented on the graphical user interface 1050. It is intended, however, that any or all lines of extension 1060, 1070, 1080 may be displayed upon selecting handle 1020.

The graphical user interface 1050 may also present a range 1065, 1075, 1085 surrounding each line of extension 1060, 1070, 1080. If handle 1020 is positioned in range 1065, 1075, 1085 and released as a desired end point location, the location may be interpreted as being on the closest point on the corresponding line of extension. It is intended that range 1065, 1075, 1085 may have any configuration. In this exemplary embodiment, range 1065, 1075, 1085 is approximately 15 pixels from the line of extension 1060, 1070, 1080 along the entire graphical user interface 1050. Alternatively, a range may vary in size along the line of extension. In an alternative embodiment, the range may increase as the line of extension extends away from the object.

The remaining area on graphical user interface 1050 that is not occupied by object 1010 or range 1065, 1075, 1085 may be considered free space 1090. Object 1010 may be resized in free space 1090 without maintaining a horizontal dimension, vertical dimension, or aspect ratio.

Figure 11:
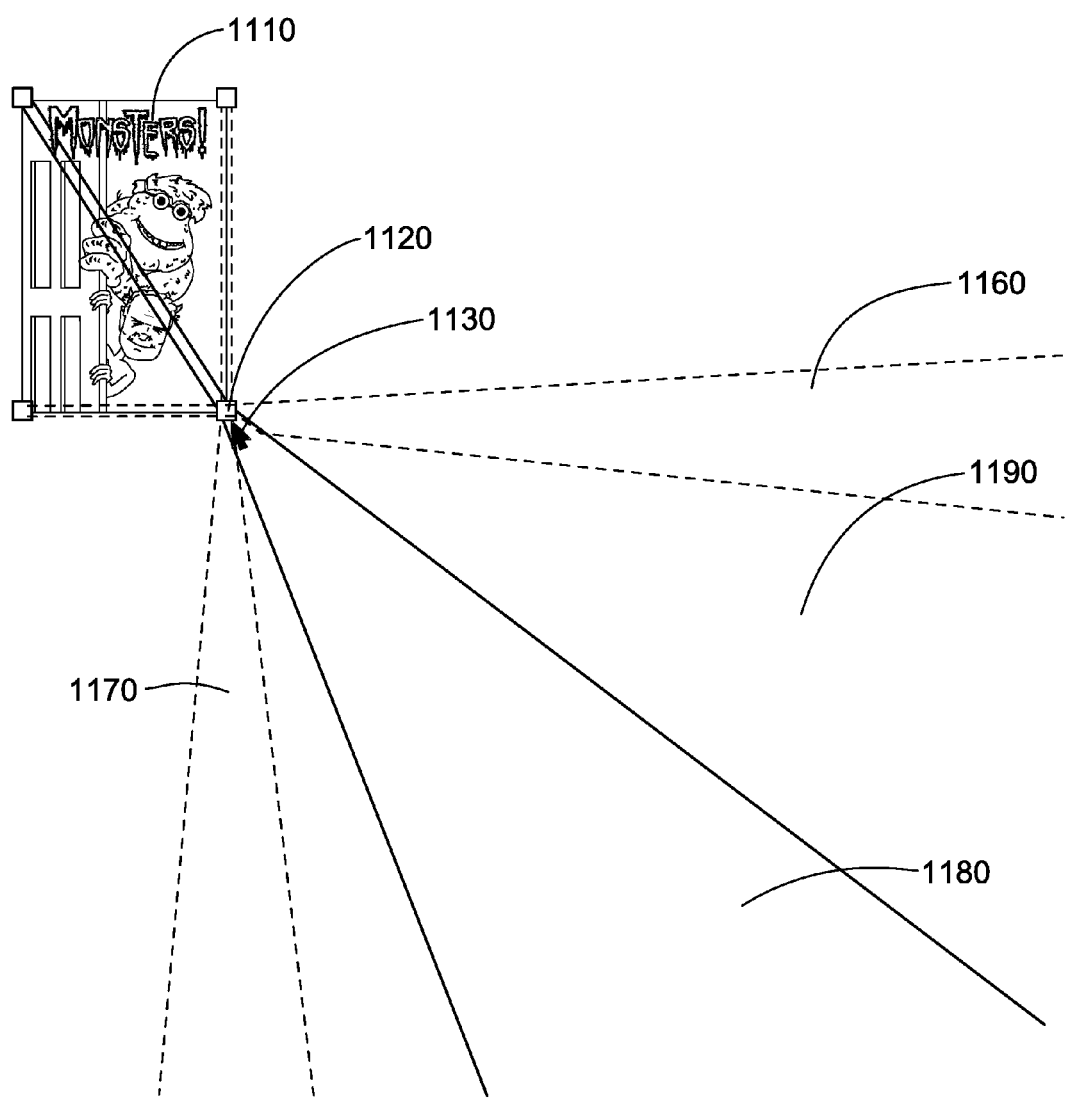
FIG. 11 shows a graphical user interface according to an exemplary embodiment.

Referring to FIG. 11, a graphical user interface 1150 having a plurality of gutters 1160, 1170, 1180 is shown. Gutters 1160, 1170, 1180 may also represent ranges surrounding a line of extension or a resizing modality. Areas excluded from an object 1110 and gutters 1160, 1170, 1180 may be considered as free space 1190 for resizing without maintaining any particular geometry of the object 1110. Gutters 1160, 1170, 1180 may be displayed on the graphical user interface 1150 upon selected of a handle 1120. Alternatively, gutters 1160, 1170, 1180 may remain hidden but have a similar effect of appropriate resizing object 1110 when the handle 1120 is positioned in that gutter 1160, 1170, 1180.

In this exemplary embodiment, the object 1110 and handle 1120 associated with that object 1110 have been selected using a cursor 1130. The user may move handle 1120 to resize object 1110. In this exemplary embodiment, handle 1120 has been selected for resizing.

In an attempt to counter the effects of Fitts's law, gutters 1160, 1170, 1180 increase in size as the gutter 1160, 1170, 1180 extends away from handle 1120. Accordingly, as the user moves handle 1120 farther away from object 1110 and has more difficulty maintaining a line of extension, gutters 1160, 1170, 1180 may account for the error in the user's movements.

Figure 12:
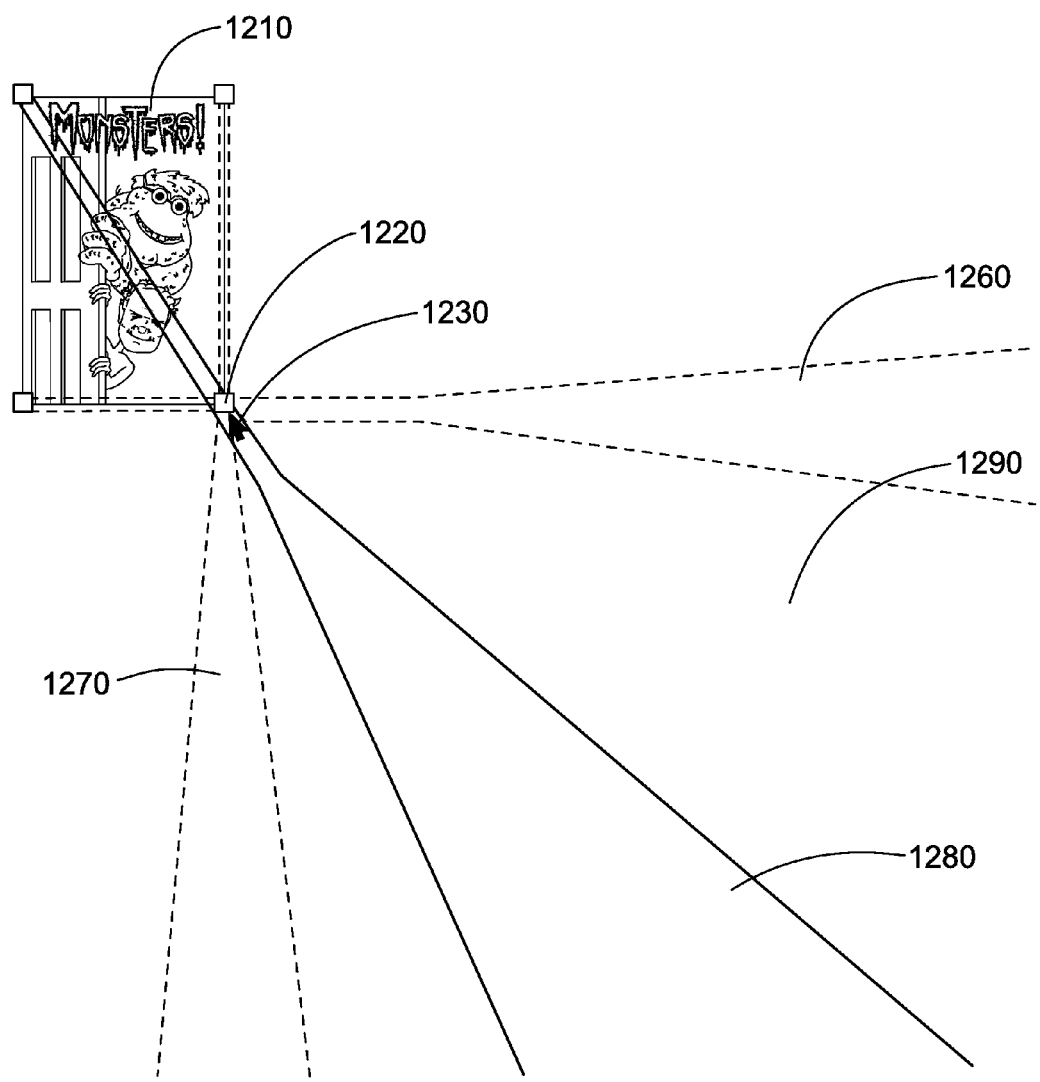
FIG. 12 shows a graphical user interface according to an exemplary embodiment.

Referring to FIG. 12, a graphical user interface 1250 having a plurality of gutters 1260, 1270, 1280 is shown. Gutters 1260, 1270, 1280 may also represent ranges surrounding a line of extension or a resizing modality. Areas excluded from an object 1210 and gutters 1260, 1270, 1280 may be considered as free space 1290 for resizing without maintaining any particular geometry of the object 1210. Gutters 1260, 1270, 1280 may be displayed on the graphical user interface 1250 upon selected of a handle 1220. Alternatively, gutters 1260, 1270, 1280 may remain hidden but have a similar effect of appropriate resizing object 1210 when the handle 1220 is positioned in that gutter 1260, 1270, 1280.

In this exemplary embodiment, the object 1210 and handle 1220 associated with that object 1210 have been selected using a cursor 1230. The user may move handle 1220 to resize object 1210. In this exemplary embodiment, handle 1220 has been selected for resizing.

In an attempt to counter the effects of Fitts's law, gutters 1260, 1270, 1280 increase in size as the gutter 1260, 1270, 1280 extends away from handle 1220. Accordingly, as the user moves handle 1220 farther away from object 1210 and has more difficulty maintaining a line of extension, gutters 1260, 1270, 1280 may account for the error in the user's movements. In this exemplary embodiment, gutters 1260, 1270, 1280 may remain narrower near the object 1210 and then expand in width further away from the object.

Figure 13:
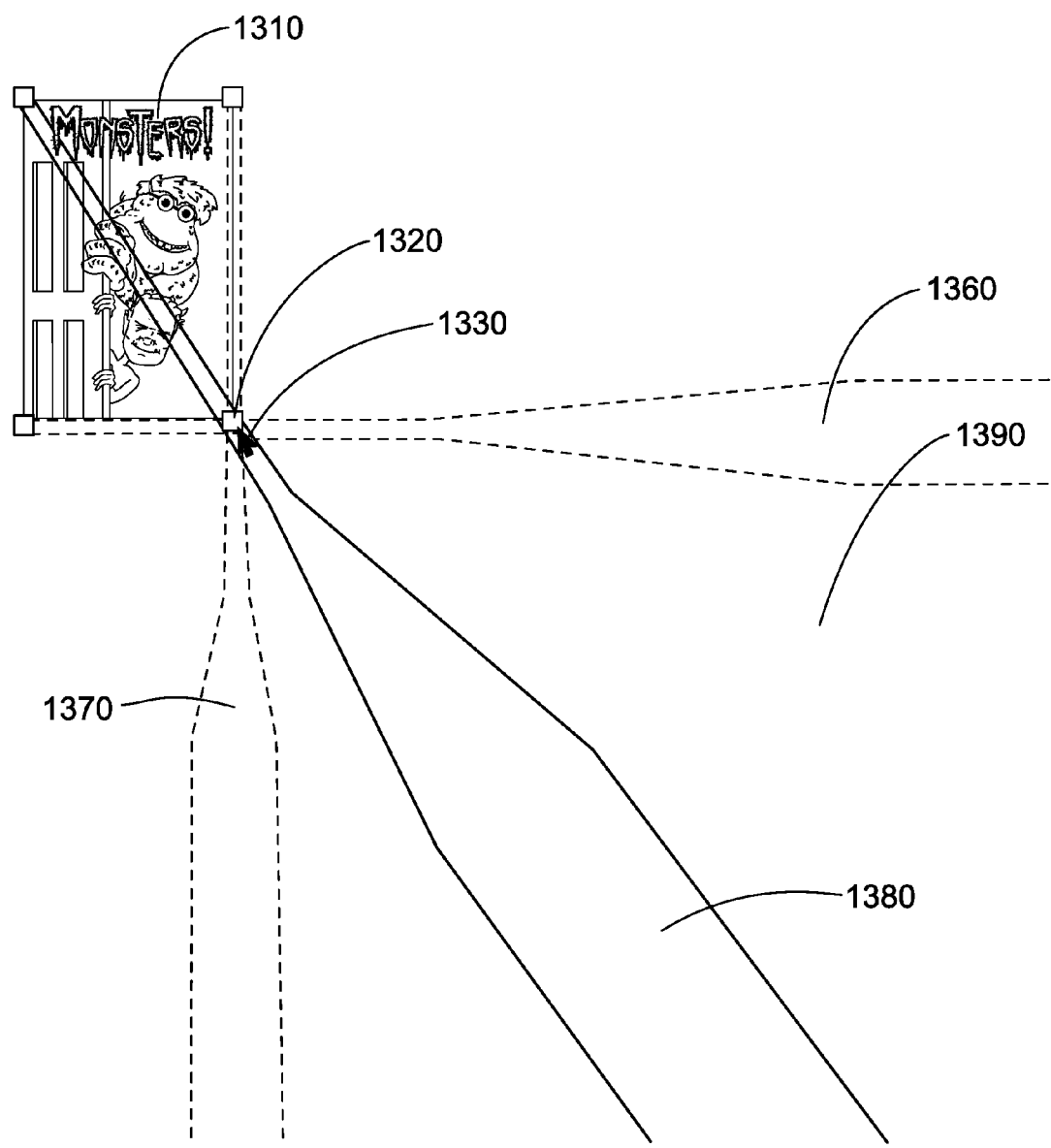
FIG. 13 shows a graphical user interface according to an exemplary embodiment.

Referring to FIG. 13, a graphical user interface 1350 having a plurality of gutters 1360, 1370, 1380 is shown. Gutters 1360, 1370, 1380 may also represent ranges surrounding a line of extension or a resizing modality. Areas excluded from an object 1310 and gutters 1360, 1370, 1380 may be considered as free space 1390 for resizing without maintaining any particular geometry of the object 1310. Gutters 1360, 1370, 1380 may be displayed on the graphical user interface 1350 upon selected of a handle 1320. Alternatively, gutters 1360, 1370, 1380 may remain hidden but have a similar effect of appropriate resizing object 1310 when the handle 1320 is positioned in that gutter 1360, 1370, 1380.

In this exemplary embodiment, the object 1310 and handle 1320 associated with that object 1310 have been selected using a cursor 1330. The user may move handle 1320 to resize object 1310. In this exemplary embodiment, handle 1320 has been selected for resizing.

In an attempt to counter the effects of Fitts's law, gutters 1360, 1370, 1380 increase in size as the gutter 1360, 1370, 1380 extends away from handle 1320. Accordingly, as the user moves handle 1320 farther away from object 1310 and has more difficulty maintaining a line of extension, gutters 1360, 1370, 1380 may account for the error in the user's movements. In this exemplary embodiment, gutters 1360, 1370, 1380 may remain narrower near the object 1310 and then expand in width further away from the object. In an attempt to avoid utilizing too much of the available graphical user interface area and prevent users from easily escaping fixed resizing constraints, gutters 1360, 1370, 1380 may maintain a fixed width once the gutter 1360, 1370, 1380 approaches a predetermined width.

In an alternative embodiment, additional commands may be used to extend or pivot between each gutter. For example, the command may include, but is not limited to, keyboard commands, mouse button commands, or commands from another input device.

In another alternative embodiment, gutters may be adjusted based on the habits or traits of the user. Using the previous resizing of objects, it may be learned which actions are favored by the user and may present only those gutters or may provide easier access to those gutters. For example, if the user always maintains the aspect ratio and never resizes in free space, then only the aspect ratio gutter may be presented to the user. Additionally, the aspect ratio gutter may be wider to accommodate for more varied mouse movements In yet another alternative embodiment, a gutter positioned on and/or near an original handle placement may provide an option for returning a resized object to the original size. For example, the gutter may be an icon positioned at the original handle location. In another example, the gutter may be a rectangular, circular, or other shape gutter at an approximate original handle location.

General

The embodiments described above are intended to be exemplary. One skilled in the art recognizes that numerous alternative components and embodiments that may be substituted for the particular examples described herein and still fall within the scope of the invention.

What is claimed is:

1. A computer-readable tangible storage device having computer program instructions embodied therein that, when executed by a computer, direct the computer to execute a method for resizing an object, the method comprising
    positioning a cursor to a handle of the object;
    selecting the handle;
    generating, by the computer, a plurality of lines of extension, each line of extension to maintain one of a height, a width, or an aspect ratio of the object;
    generating a gutter about each of the plurality of lines of extension;
    repositioning the handle in a direction away from the object along a path;
    confirming a new location of the handle;
    determining whether the new location of the handle is within one of the gutters;
    resizing the object based on whether the new location of the handle is determined to be within one of the gutters; and
    displaying the resized object,
    wherein a width of each of the gutters remains constant over a first length extending away from the object, increases in size over a second length extending away from the object, and remains constant over a third length extending away from the object,
    wherein the width of one end of the second length is the same as the width of the first length and the width of an opposite end of the second length is the same as the width of the third length.

2. The computer-readable tangible storage device according to claim 1, the method further comprising displaying the gutters.

3. The computer-readable tangible storage device according to claim 1, the method further comprising
    alternating between the plurality of gutters in response to receipt of a command input by an input device.

4. The computer-readable tangible storage device according to claim 1, the method further comprising generating a gutter at approximately an original handle location to return the object to an original size once the object has been resized.

5. The computer-readable tangible storage device according to claim 1, the method further comprising displaying the plurality of lines of extension.

6. The computer-readable tangible storage device according to claim 1, wherein the plurality of lines of extension each indicate a path maintaining a fixed height, a fixed width, or a fixed aspect ratio.

7. A computer-readable tangible storage device having computer program instructions embodied therein that, when executed by a computer, direct the computer to execute a method for resizing an object, the method comprising
    establishing, by the computer, a plurality of gutters in response to selecting a handle on a corner of the object, wherein the plurality of gutters comprise
        a horizontal gutter extending from the corner in a horizontal direction,
        a vertical gutter extending from the corner in a vertical direction, and
        an aspect ratio gutter extending from the corner along a line having a same vertical to horizontal ratio as an aspect ratio of the object; moving the handle to a new position;
    displaying, during the moving, one of a horizontal, vertical, or aspect ratio resizing indicator according to whether the new position is within one of the gutters;
    displaying, during the moving, a representation of a resized version of the object based upon the new position of the handle;
    determining whether the new position of the handle is within one of the horizontal, the vertical, and the aspect ratio gutters after the moving;
    when the new position of the handle is determined to be within the horizontal gutter, resizing the object in only a horizontal direction;
    when the new position of the handle is determined to be within the vertical gutter, resizing the object in only a vertical direction;
    when the new position of the handle is determined to be within the aspect ratio gutter, resizing the object by maintaining the aspect ratio of the object;
    when the new position of the handle is determined to be outside all of the plurality of gutters, resizing the object in a direction according to the new position; and
    displaying the resized object,
    wherein a width of each of the gutters remains constant in width over a first length extending away from the object, increases over a second length extending away from the object, and remains constant over a third length extending away from the object,
    wherein the width of one end of the second length is the same as the width of the first length and the width of an opposite end of the second length is the same as the width of the third length.

8. The computer-readable tangible storage device according to claim 7, the method further comprising displaying one or more of the gutters.

9. The computer-readable tangible storage device according to claim 7, the method further comprising alternating between the plurality of gutters in response to receipt of a command input by an input device.

10. The computer-readable tangible storage device according to claim 7, wherein establishing a plurality of gutters further comprises establishing a gutter configuration comprising one or more fixed height, fixed width, and fixed aspect ratio gutters based on a previous resizing of objects.

11. The computer-readable tangible storage device according to claim 7, wherein the plurality of gutters include a gutter at approximately an original handle location to return the object to an original size once the object has been resized.

12. A computer-implemented method for resizing an object represented on a user interface, the method comprising:
    receiving, from an input device, a first directional input representing an initial trajectory from a first point associated with the object toward a second point;
    generating, by a computer, a plurality of lines of extension, each line of extension to maintain one of a height, a width, or an aspect ratio of the object;
    generating a gutter about each of the plurality of lines of extension;
    based upon the first directional input, inferring a resizing modality from among a plurality of resizing modalities according to whether the second point is within one of the gutters, and selecting the inferred resizing modality from among the plurality of resizing modalities for accommodating the first directional input; and
    presenting an indicator of the selected resizing modality on the user interface, whereby the indicator of the selected resizing modality provides a guide to facilitate resizing the object towards the second desired location,
    wherein a width of each of the gutters remains constant over a first length extending away from the object, increases over a second length extending away from the object, and remains constant over a third length extending away from the object,
    wherein the width of one end of the second length is the same as the width of the first length and the width of an opposite end of the second length is the same as the width of the third length.

13. The method according to claim 12, wherein the first point is a handle.

14. The method according to claim 12, wherein the resizing modality comprises maintaining a height of the object and the indicator of the selected resizing modality comprises a horizontal line having an arrowhead at each end.

15. The method according to claim 12, wherein the resizing modality comprises maintaining a width of the object and the indicator of the selected resizing modality comprises a vertical line having an arrowhead at each end.

16. The method according to claim 12, wherein the resizing modality comprises maintaining an aspect ratio of the object and the indicator of the selected resizing modality comprises a line having an arrowhead at each end.

17. A system for resizing an object, the system comprising:
    an input device to select and reposition an adjustment mechanism of the object; and a computer that
    generates a horizontal line of extension to maintain a height of the object, a vertical line of extension to maintain a width of the object, and an aspect ratio line of extension to maintain an aspect ratio of the object,
    generates a horizontal gutter about the horizontal line of extension that maintains a fixed height of the object when the adjustment mechanism is positioned in the horizontal gutter, a vertical gutter about the vertical line of extension that maintains a fixed width of the object when the adjustment mechanism is positioned in the vertical gutter, and an aspect ratio gutter about the aspect ratio line of extension that maintains a fixed aspect ratio of the object when the adjustment mechanism is positioned in the aspect ratio gutter, and
    determines whether the adjustment mechanism is within one of the horizontal, vertical, or aspect ratio gutters after the adjustment mechanism is repositioned by the input device, wherein a width of each of the gutters remains constant in width over a first length extending away from the object, increases over a second length extending away from the object, and remains constant over a third length extending away from the object, wherein the width of one end of the second length is the same as the width of the first length and the width of an opposite end of the second length is the same as the width of the third length.

18. The system according to claim 17, further comprising a display that displays one or more of the gutters.

19. The system according to claim 17, wherein the computer further alternates between the gutters in response to receipt of a command input by the input device.

20. The system according to claim 17, wherein the computer further generates the gutters based on a previous resizing of objects.

21. The system according to claim 17, wherein the computer further generates a gutter at approximately an original location of the adjustment mechanism to return the object to an original size once the object has been resized.

22. The system according to claim 17, wherein the adjustment mechanism is a handle.

23. A system for resizing an object comprising:
means for selecting the object;
means for indicating a new dimension of the object according to an input from the means for selecting;
means for generating a plurality of lines of extension, each line of extension to maintain one of a height, a width, or an aspect ratio of the object;
means for generating a gutter about each of the plurality of lines of extension;
means for indicating maintenance of a geometrical dimension of the object according to whether the new dimension is within one of the gutters; and
means for reconfiguring the object according to the geographical dimension when the new dimension is within one of the gutters,
wherein a width of each of the gutters remains constant in width over a first length extending away from the object, increases over a second length extending away from the object, and remains constant over a third length extending away from the object,
wherein the width of one end of the second length is the same as the width of the first length and the width of an opposite end of the second length is the same as the width of the third length.

24. The system according to claim 23, wherein the means for selecting comprises a cursor.

25. The system according to claim 23, wherein the means for indicating comprises a handle associated with the object.

26. The system according to claim 23, wherein the means for indicating maintenance of a geometrical dimension comprises an indicator of a resizing modality.

27. The system according to claim 23, wherein the geometrical dimension comprises at least one of a horizontal dimension, a vertical dimension, and an aspect ratio.

* * * * *